(12) United States Patent
Nazeer et al.

(10) Patent No.: US 8,381,531 B2
(45) Date of Patent: Feb. 26, 2013

(54) GAS TURBINE FUEL INJECTOR WITH A RICH CATALYST

(75) Inventors: Waseem Ahmad Nazeer, La Jolla, CA (US); Kenneth Owen Smith, San Diego, CA (US); Frank John Ritz, San Diego, CA (US)

(73) Assignee: Solar Turbines Inc., San Diego, CA (US)

(*) Notice: Subject to any disclaimer, the term of this patent is extended or adjusted under 35 U.S.C. 154(b) by 752 days.

(21) Appl. No.: 12/289,969

(22) Filed: Nov. 7, 2008

(65) Prior Publication Data

US 2010/0115954 A1 May 13, 2010

(51) Int. Cl.
*F02C 1/00* (2006.01)

(52) U.S. Cl. .............. 60/777; 60/737; 60/748

(58) Field of Classification Search ........ 60/723, 60/737, 740, 746–748, 777; 239/399, 427; 431/7, 170
See application file for complete search history.

(56) References Cited

U.S. PATENT DOCUMENTS

| | | | |
|---|---|---|---|
| 5,207,053 A * | 5/1993 | Spadaccini et al. ............ 60/780 |
| 5,518,697 A | 5/1996 | Dalla Betta et al. |
| 5,601,426 A | 2/1997 | Pfefferle |
| 5,729,967 A * | 3/1998 | Joos et al. ............ 60/39.6 |
| 5,904,040 A | 5/1999 | Hums et al. |
| 5,946,917 A | 9/1999 | Hums et al. |
| 5,950,434 A | 9/1999 | Hums et al. |
| 6,179,608 B1 | 1/2001 | Kraemer et al. |
| 6,415,608 B1 | 7/2002 | Newburry |
| 6,588,213 B2 | 7/2003 | Newburry |
| 6,619,043 B2 | 9/2003 | Bruck et al. |
| 6,630,423 B2 | 10/2003 | Alvin et al. |
| 6,662,564 B2 | 12/2003 | Bruck et al. |
| 6,701,764 B2 | 3/2004 | Bruck et al. |
| 6,708,496 B2 | 3/2004 | Gadde et al. |
| 6,715,295 B2 | 4/2004 | Gadde et al. |
| 6,775,989 B2 | 8/2004 | Bandaru et al. |
| 6,810,670 B2 | 11/2004 | Bruck et al. |
| 6,829,896 B2 | 12/2004 | Bruck et al. |
| 6,923,001 B2 | 8/2005 | Laster et al. |
| 6,966,186 B2 | 11/2005 | Bachovchin et al. |
| 7,096,667 B2 | 8/2006 | Laster et al. |
| 7,096,671 B2 | 8/2006 | Bland et al. |
| 7,469,543 B2 * | 12/2008 | Veninger ............ 60/723 |
| 2002/0139122 A1 | 10/2002 | Alvin et al. |
| 2003/0056511 A1 | 3/2003 | Bruck et al. |
| 2003/0056512 A1 | 3/2003 | Bruck et al. |
| 2003/0056519 A1 | 3/2003 | Newburry |
| 2003/0056560 A1 | 3/2003 | Bruck et al. |

(Continued)

*Primary Examiner* — Phutthiwat Wongwian
(74) *Attorney, Agent, or Firm* — Finnegan, Henderson, Farabow, Garrett & Dunner LLP

(57) ABSTRACT

A fuel injector for a gas turbine engine may include a pilot assembly extending along a longitudinal axis. The pilot assembly may be configured to direct a pilot fuel-air mixture to a combustor of the gas turbine engine. The fuel injector may also include a rich catalyst module circumferentially disposed about the pilot assembly. The catalyst module may be configured to simultaneously direct a stream of compressed air and a stream of first fuel-air mixture therethrough without intermixing. The fuel injector may also include a post mix zone disposed downstream of the catalyst module. The post mix zone may be configured to mix the compressed air and the first fuel air mixture to create a main fuel-air mixture. The fuel injector may further include an air swirler disposed downstream of the post mix zone. The air swirler may be configured to direct the main fuel-air mixture to the combustor without intermixing with the pilot fuel-air mixture.

14 Claims, 3 Drawing Sheets

U.S. PATENT DOCUMENTS

| | | |
|---|---|---|
| 2003/0103875 A1 | 6/2003 | Campbell et al. |
| 2003/0217553 A1 | 11/2003 | Gadde et al. |
| 2003/0217554 A1 | 11/2003 | Gadde et al. |
| 2004/0050053 A1 | 3/2004 | Bandaru et al. |
| 2004/0050054 A1 | 3/2004 | Bruck et al. |
| 2004/0112057 A1 | 6/2004 | Bruck et al. |
| 2005/0011194 A1 | 1/2005 | Laster et al. |
| 2005/0066663 A1 | 3/2005 | Alvin et al. |
| 2005/0070431 A1 | 3/2005 | Alvin et al. |
| 2005/0126755 A1 | 6/2005 | Berry et al. |
| 2005/0150231 A1 | 7/2005 | Laster et al. |
| 2005/0188702 A1 | 9/2005 | Bachovchin et al. |
| 2005/0201906 A1 | 9/2005 | Alvin et al. |
| 2005/0241313 A1 | 11/2005 | Bruck |
| 2005/0250643 A1 | 11/2005 | Burns et al. |
| 2006/0032227 A1 | 2/2006 | Bruck et al. |
| 2006/0156735 A1 | 7/2006 | Laster et al. |
| 2006/0225429 A1 | 10/2006 | Szedlacsek et al. |
| 2006/0245984 A1 | 11/2006 | Kulkarni et al. |
| 2006/0248872 A1 | 11/2006 | Bachovchin et al. |
| 2007/0000254 A1 | 1/2007 | Laster et al. |
| 2007/0006595 A1 | 1/2007 | Bruck et al. |
| 2007/0089417 A1* | 4/2007 | Khanna ............................ 60/723 |
| 2008/0092513 A1* | 4/2008 | Carroni et al. ............... 60/39.23 |

* cited by examiner

GAS TURBINE FUEL INJECTOR WITH A RICH CATALYST

TECHNICAL FIELD

The present disclosure relates generally to a fuel injector for a gas turbine engine, and more particularly, to a gas turbine fuel injector with a rich catalyst.

BACKGROUND

Gas turbine engines produce power by extracting energy from a flow of hot gas produced by combustion of a fuel-air mixture. In general, gas turbine engines have an upstream air compressor coupled to a downstream turbine with a combustion chamber ("combustor") in between. Energy is released when a mixture of compressed air and fuel is ignited in the combustor. The resulting hot gases are used to spin blades of the turbine, and produce mechanical power. In typical turbine engines, one or more fuel injectors direct some type of fuel (liquid or gaseous fuel) into the combustor for combustion. The fuel is mixed with compressed air in the fuel injector, and delivered to the combustor for combustion. Combustion of some fuels result in the production of undesirable constituents, such as $NO_x$ (nitrogen oxide (NO) and nitrogen dioxide ($NO_2$)), in exhaust emissions.

One approach that has been used to reduce $NO_x$ emissions is to reduce the equivalence ratio (equivalence ratio is the actual ratio of fuel and air in the fuel-air mixture to the stoichiometric ratio of the fuel-air mixture) of the fuel-air mixture directed to the combustor. A fuel-air mixture with an equivalence ratio less than 1 is called a lean fuel-air mixture (lean fuel). While lean fuel reduces $NO_x$ emissions, government regulations that restrict the amount of $NO_x$ and other undesirable gas turbine emissions continue to tighten. It is known that catalytic combustion can provide further reduction in gas turbine engine $NO_x$ emissions. In catalytic combustion, a portion of the fuel-air mixture may be combusted in a catalyst system included in the fuel injector. While fuel injectors utilizing lean catalyst systems may reduce $NO_x$ emissions, these systems may require a relatively uniform fuel-air mixture (having variation in fuel to air ratio of less than about±3% in some cases) to be directed to the catalyst system. Providing a uniform fuel-air mixture may require additional components that may increase the cost of the gas turbine engine.

An alternate method of reducing $NO_x$ emissions, while alleviating some of the deficiencies of a lean catalyst, is to direct a rich fuel (fuel-air mixture with an equivalence ratio greater than 1) through a rich fuel catalyst system (rich catalyst). The construction and composition (such as the catalyst used, etc.) of the rich catalyst may be same as a lean catalyst, but may be optimized to catalyze rich fuel. U.S. Pat. No. 6,358,040 ('040 patent) issued to Pfefferle et al. discloses a gas turbine fuel injector incorporating a rich catalyst. In the system of the '040 patent, a rich fuel is directed to the combustor through a rich catalyst to oxidize a portion of the fuel in the mixture flowing therethrough. In the system of the '040 patent, only a relatively small portion of the fuel in the rich fuel is oxidized in the catalyst. The partially combusted mixture exiting the rich catalyst is mixed with additional compressed air to create a mixture lean in fuel. This lean mixture is then directed to the combustor for combustion through a path which is devoid of structures/devices that may cause flame holding and premature inflammation of the mixture.

While the fuel injector of the '040 patent may decrease the $NO_x$ produced by the turbine engine, it may have some drawbacks. For instance, the necessity of avoiding flame holding sites in the fluid flow path from the catalyst to the combustor may prevent the use of conventional flame stabilization mechanisms such as air swirlers and bluff body stabilizers. Elimination of these flame stabilization mechanisms may, in some cases, necessitate a longer combustor for complete combustion of the fuel. In addition to increasing the cost of the combustor, a larger combustor may present difficulties in applications where space is at a premium. The present disclosure is directed at overcoming these or other shortcomings of existing technology.

SUMMARY

In one aspect, a fuel injector for a gas turbine engine is disclosed. The fuel injector may include a pilot assembly extending along a longitudinal axis. The pilot assembly may be configured to direct a pilot fuel-air mixture to a combustor of the gas turbine engine. The fuel injector may also include a rich catalyst module circumferentially disposed about the pilot assembly. The catalyst module may be configured to simultaneously direct a stream of compressed air and a stream of first fuel-air mixture therethrough without intermixing. The fuel injector may also include a post mix zone disposed downstream of the catalyst module. The post mix zone may be configured to mix the compressed air and the first fuel air mixture to create a main fuel-air mixture. The fuel injector may further include an air swirler disposed downstream of the post mix zone. The air swirler may be configured to direct the main fuel-air mixture to the combustor without intermixing with the pilot fuel-air mixture.

In another aspect, a method of delivering fuel to a combustor of a gas turbine engine is disclosed. The method may include directing a pilot fuel-air mixture to the combustor through a pilot assembly, and directing a stream of rich fuel-air mixture and a stream of compressed air through a catalyst module without intermixing. The rich fuel-air mixture may be a fuel-air mixture having an equivalence ratio greater than one. The method may also include mixing the rich fuel-air mixture and the compressed air in a post mix zone to create a lean fuel-air mixture. The lean fuel-air mixture may be a fuel-air mixture having an equivalence ratio less than one. The method may further include imparting a swirl to the lean fuel-air mixture exiting the post mix zone, and directing the swirled lean fuel-air mixture to the combustor without intermixing with the pilot fuel-air mixture.

In yet another aspect, a fuel injector for a gas turbine engine is disclosed. The fuel injector may include a central passageway configured to direct a stream of pilot fuel-air mixture to a combustor of the gas turbine engine, and an annular outer passageway positioned circumferentially about the central passageway and configured to direct a stream of lean fuel-air mixture to the combustor without mixing with the pilot fuel-air mixture. The fuel injector may also include a catalyst module positioned in the outer passageway. The catalyst module may be configured to simultaneously direct a stream of compressed air and a stream of rich fuel-air mixture therethrough without intermixing. The fuel injector may also include a post mix zone positioned downstream of the catalyst module. The post mix zone may be configured to mix the compressed air and the rich fuel-air mixture to create the lean fuel-air mixture. The fuel injector may further include an air swirler positioned downstream of the post mix zone.

DETAILED DESCRIPTION

Figure 1:
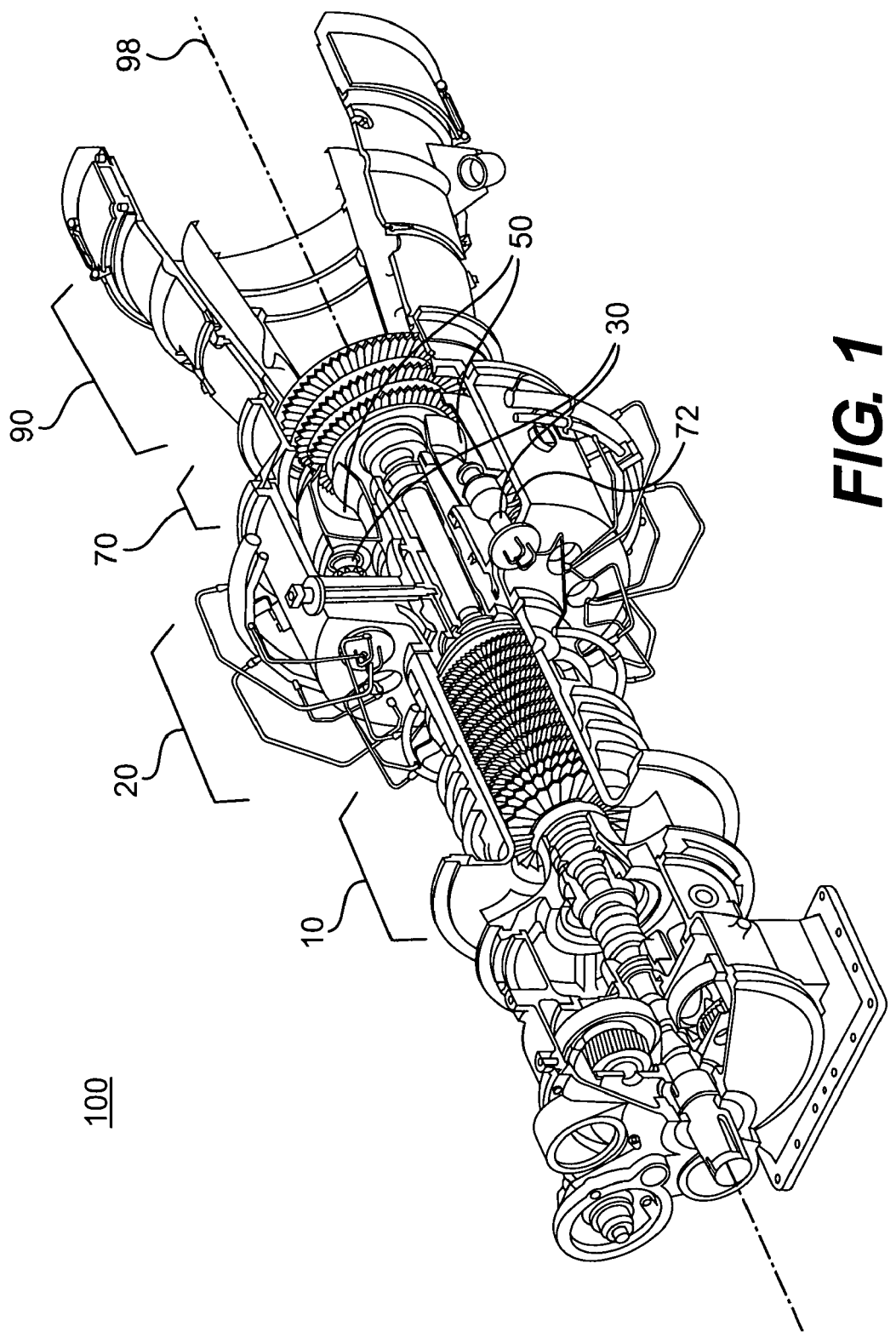
FIG. 1 is an illustration of an exemplary disclosed gas turbine engine system.

FIG. 1 illustrates an exemplary gas turbine engine (GTE) 100. GTE 100 may have, among other systems, a compressor system 10, a combustor system 20, a turbine system 70, and an exhaust system 90 arranged along an engine axis 98. Compressor system 10 may compress air to a high pressure and deliver the compressed air to one or more fuel injectors 30 of combustor system 20. A fuel may also be delivered to fuel injectors 30. The compressed air may be mixed with the fuel in fuel injector 30 and directed through a catalyst system (not shown) included therein. The catalyst system may be configured to oxidize a portion of the fuel passing therethrough. The partially combusted mixture exiting the catalyst system may be further mixed with compressed air to create a mixture lean in fuel (lean fuel-air mixture), and this mixture may be directed to a combustor 50. The lean fuel-air mixture may ignite and burn in combustor 50 to produce combustion gases at a high temperature and pressure. These combustion gases may be directed to turbine system 70. Turbine system 70 may extract energy from these combustion gases, and direct the exhaust gases to the atmosphere through exhaust system 90. Exhaust system 90 may remove contaminants and other constituents from the exhaust gases before they are exhausted to the atmosphere. The layout of GTE 100 illustrated in FIG. 1, and described above, is only exemplary and fuel injectors 30 of the current disclosure may be used with any configuration and layout of GTE 100.

Figure 2A:
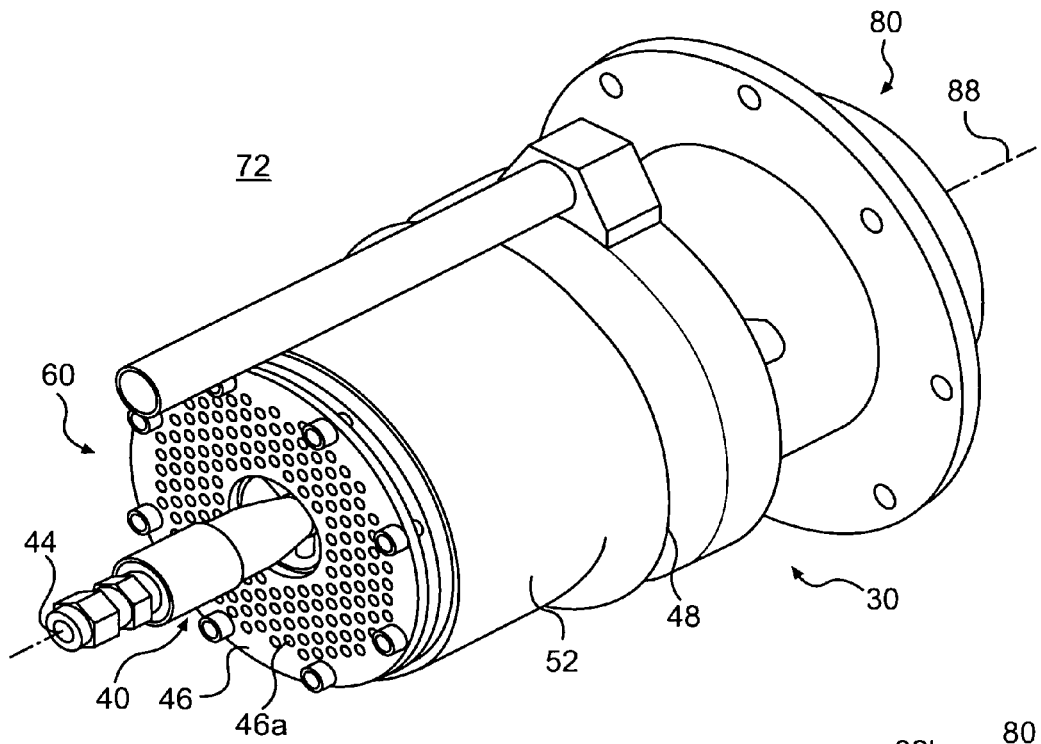
FIG. 2A is an external view of a fuel injector of FIG. 1.
Figure 2B:
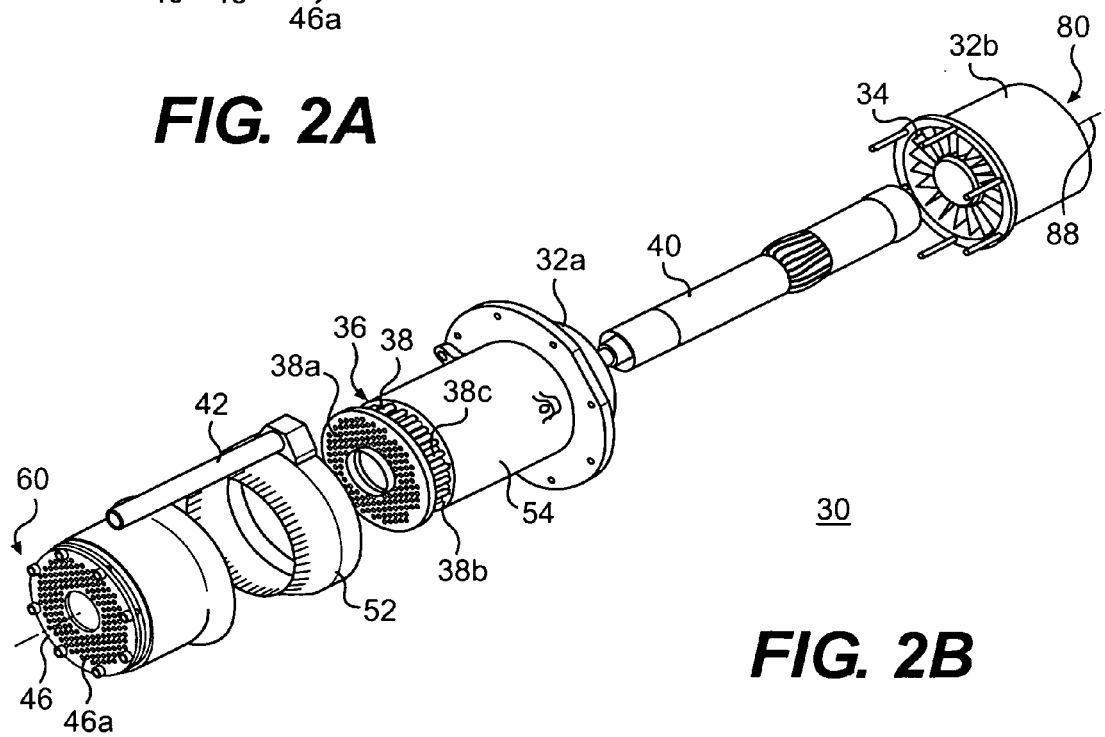
FIG. 2B is an illustration of some of the components that make up the fuel injector of FIG. 2.
Figure 2C:
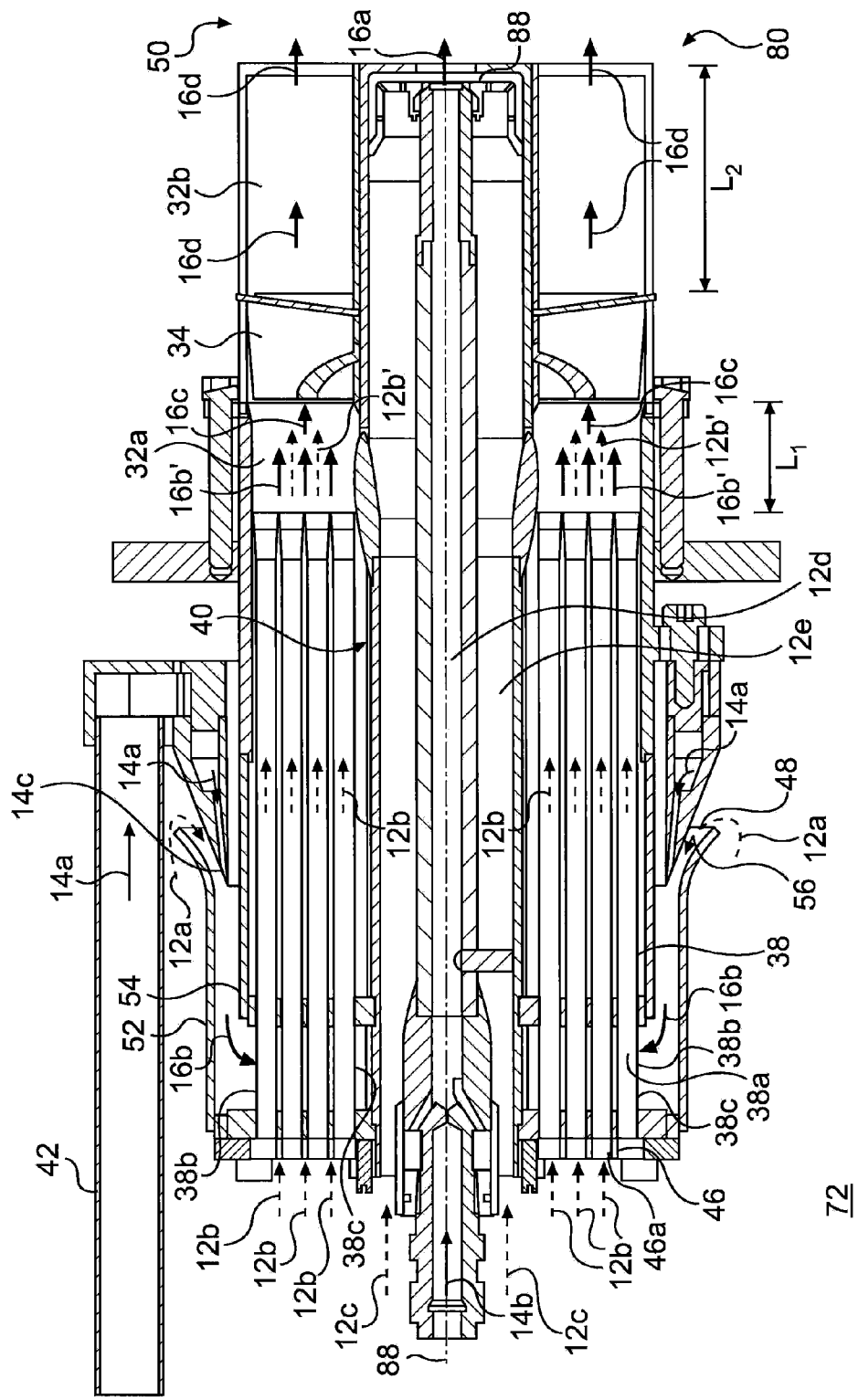
FIG. 2C is a cross-sectional view of the fuel injector of FIG. 2A.

FIGS. 2A-2C illustrate different views of an exemplary fuel injector 30 that may be used with GTE 100. FIG. 2A illustrates an assembled external view of fuel injector 30, FIG. 2B illustrates a disassembled view showing some of the major components of fuel injector 30, and FIG. 2C illustrates a cross-sectional view along a plane passing through a longitudinal axis 88. FIG. 2C also schematically illustrates the flow of compressed air, fuel, and fuel-air mixture through fuel injector 30. In FIG. 2C, compressed air flow is depicted using dashed lines, fuel flow is depicted using solid lines, and the fuel-air mixture flow is depicted using heavy solid lines. In the discussion that follows, reference will be made to FIGS. 2A-2C.

Fuel injector 30 may have a generally cylindrical shape that extends from a first end 60 to a second end 80 along the longitudinal axis 88. In GTE 100, fuel injector 30 may be positioned in an enclosure 72 (see FIG. 1) containing compressed air from compressor system 10. Fuel injector 30 may be positioned in enclosure 72 such that second end 80 of the fuel injector 30 may extend into combustor 50. Fuel injector 30 may include a pilot assembly 40 extending from first end 60 to second end 80 along a center of fuel injector 30. Fuel injector 30 may also include a rich catalyst module 36 between the first and second ends 60 and 80. Catalyst module 36 may be positioned annularly around pilot assembly 40.

Catalyst module 36 may include any rich catalyst known in the art. In one embodiment, catalyst module 36 may include multiple hollow tubes 38 having cavities 38a that extend along longitudinal axis 88 of fuel injector 30. These multiple tubes 38 may be coated on an external surface 38c with a catalyst material (such as, rhodium, palladium, iridium, ruthenium, platinum, etc.) and bundled together to form catalyst module 36. Since rich catalyst modules are known in the art, only those details of the catalyst module 36 that are useful to describe the fuel injector 30 of the current disclosure are included herein. A housing 54 may be disposed circumferentially around a part of the length of multiple tubes 38 of catalyst module 36. A portion of the length of multiple tubes 38, proximate first end 60, that extends from housing 54 may form an exposed portion 38b. Exposed portion 38b may include a portion of the length of multiple tubes 38 that are not covered by housing 54.

Catalyst module 36 may occupy an annular space between pilot assembly 40 and housing 54 such that two separate fluid flow paths may be defined through catalyst module 36. These two separate fluid flow paths may include an outer flow path and an inner flow path. Fluid flowing through the outer flow path may flow through a space between housing 54 and the catalyst coated external surfaces 38c of the multiple tubes 38, and fluid flowing through the inner flow path may flow through cavities 38a of the multiple tubes 38 of catalyst module 36. A fluid flowing through the outer flow path may come in contact with the catalyst of catalyst module 36, while the fluid flowing through the inner flow path may not contact the catalyst.

A shroud 52 may be positioned over housing 54 and exposed portion 38b to define an annular passageway 56 between housing 54 and shroud 52. Annular passageway 56 may define an inlet opening 48 between housing 54 and shroud 52 at one end. During operation, compressed air 12a from enclosure 72 may enter passageway 56 through inlet opening 48 and flow towards exposed portion 38b of catalyst module 36. A fuel line 42 may also be coupled to shroud 52. Fuel line 42 may be fluidly coupled, through conduits and nozzles (not identified), to passageway 56. Fuel 14a may be directed (sprayed or otherwise delivered) through an injection orifice 14C within the shroud 52 to compressed air 12a traveling through passageway 56. This fuel 14a may mix with compressed air 12a to form a rich fuel-air mixture 16b. Rich fuel-air mixture 16b may include fuel mixed with compressed air such that the variation of the fuel to air ratio at different regions of the mixture may be within about ±10%. The temperature of rich fuel-air mixture 16b may be close to the temperature of the air discharged by compressor system 10. In some applications, this temperature may be about 800° F. Although, the relative proportions of fuel and air in rich fuel-air mixture 16b may vary with application, in general, rich fuel-air mixture 16b may have an equivalence ratio greater than one. Rich fuel-air mixture 16b may include fuel mixed with compressed air such that the variation of the fuel to air ratio at different regions of the mixture may be within about ±10%. The temperature of rich fuel-air mixture 16b may be close to the temperature of the air discharged by compressor system 10. In some applications, this temperature may be about 800° F. Although, the relative proportions of fuel and air in rich fuel-air mixture 16b may vary with application, in general, rich fuel-air mixture 16b may have an equivalence ratio greater than one.

Rich fuel air mixture 16b may enter the outer flow path of catalyst module 36 through exposed portion 38b and flow towards second end 80 of fuel injector 30. As rich fuel-air mixture 16b flows along the outer flow path, the mixture may contact the catalyst coated external surfaces 38c of the multiple tubes 38, and partially oxidize. During partial oxidation, rich fuel-air mixture 16b may partially burn in a catalytic process to form a heated fuel-air mixture 16b'. The temperature and the composition of heated fuel-air mixture 16b' may vary with application. In general, the equivalence ratio of the heated fuel-air mixture 16b' may be less than the equivalence ratio of the rich fuel-air mixture 16b. In some applications, between about 15-25% of the fuel in rich fuel-air mixture 16b. may be combusted in catalyst module 36. This heated fuel-air mixture 16b' may continue to flow through the outer flow path and exit catalyst module 36 at a downstream end. As the mixture flows through the outer flow path, some of the heat of heated fuel-air mixture 16b' may be transferred to multiple tubes 38.

Compressed air 12b from enclosure 72 may also enter catalyst module 36 through openings 46a of end plate 46 at first end 60. This compressed air 12b may enter cavities 38a of the multiple tubes 38 and flow towards the second end 80 through the inner flow path of the catalyst module 36. The compressed air 12b flowing through cavities 38a may remove some of the heat of combustion of rich fuel-air mixture 16b and form heated compressed air 12b'. Removal of a part of the heat of combustion by the compressed air flowing through cavities 38a may help to keep the temperature of catalyst module 36 within acceptable limits. The heated compressed air 12b' may also exit catalyst module 36 at the downstream end.

Downstream of catalyst module 36, the heated fuel-air mixture 16b' exiting the outer flow path and the heated compressed air 12b' exiting the inner flow path may mix in a post mix zone 32a. Mixing of the heated fuel-air mixture 16b' and the heated compressed air 12b' in the post mix zone 32a, between may create a heated lean fuel-air mixture 16c. The composition and temperature of heated lean fuel-air mixture 16c may vary with application. However, in general, the equivalence ratio of heated lean fuel-air mixture 16c may be less than one. The size of post mix zone 32a may be selected to enable the formation of a well-mixed, heated lean fuel-air mixture 16c without excessively increasing the length of the fuel injector 30. Although the size of the post mix zone 32a may vary with application, in some embodiments, a length $L_1$. of post mix zone 32a may be between about 0.8 inches to about 2 inches.

Downstream of the post mix zone 32a, fuel injector 30 may include an air swirler 34. In some embodiments, air swirler 34 may be an axial air swirler. Air swirler 34 may include a plurality of curved blades configured to impart a swirl to the heated lean fuel-air mixture 16c entering air swirler 34. The swirled lean fuel-air mixture exiting air swirler 34 may then enter combustor 50 through a secondary mixing zone 32b disposed downstream of air swirler 34. In this disclosure, the swirled lean fuel-air mixture entering combustor 50 through secondary mixing zone 32b will be referred to as the main fuel-air mixture 16d. Air swirler 34 and secondary mixing zone 32b may cooperate to provide turbulence to the main fuel-air mixture 16d entering combustor 50. This turbulence may be beneficial to produce a compact flame in the combustor 50 and to enable complete combustion of the fuel in a reduced length of combustor 50. The size of the air swirler 34 and secondary mixing zone 32b may vary with application. In some applications, secondary mixing zone 32b may have a length $L_2$ between about 0.5 to 4 inches.

The turbulent main fuel-air mixture 16d entering combustor 50 may burn in combustor to produce compact low temperature flames. The compact nature of the flame may enable complete combustion of the main fuel-air mixture 16d in a short length of combustor 50, and the low flame temperature may decrease $NO_x$ emissions of GTE 100. However, in some cases, a low flame temperature may cause the flame to be unstable. To reduce $NO_x$ emissions of GTE 100, while maintaining a stable flame in combustor 50, a fuel-rich mixture may also be directed to combustor 50 through pilot assembly 40. Since the functioning of a pilot assembly is well known in the art, for the sake of brevity, details of pilot assembly 40 will not be described herein. Fuel 14b and compressed air 12c may enter pilot assembly (or center body) 40 at first end 60 via central passage 12D and an outer passage 12E respectively and exit the second end 80 as a mixture having a higher concentration of fuel than main fuel-air mixture 16d. In some embodiments, the mixture may also include a spray of fuel and air. In this disclosure, the mixture directed to combustor 50 through pilot assembly 40 will be referred to as pilot fuel-air mixture 16a. The pilot fuel-air mixture 16a may enter combustor 50 radially inwards of the main fuel-air mixture 16d. Pilot fuel-air mixture 16a may burn in combustor 50 to produce a localized hot flame that may stabilize the combustion process at the cost of slightly increasing $NO_x$ emissions. To minimize $NO_x$ emissions while maintaining the stability of the combustion process, a control system (not shown) of GTE 100 may activate, or increase, the flow of pilot fuel-air mixture 16a when an unstable combustion event is detected.

In some embodiments, a portion of the pilot fuel-air mixture 16a may be mixed with main fuel-air mixture 16d before being directed to combustor 50. Mixing the pilot fuel-air mixture 16a with the main fuel-air mixture 16d may typically be accomplished by redirecting a portion of the pilot fuel-air mixture 16a to the main fuel-air mixture 16d through air swirler 34 or through secondary mixing zone 32b. In other embodiments, the pilot and the main fuel-air mixtures 16a, 16d may be separately directed to combustor 50. Separately directing the pilot and the main fuel-air mixtures 16a, 16d to combustor 50 may enable the control system to selectively vary the relative proportions and equivalence ratios of pilot and main fuel-air mixtures 16a, 16d.

Industrial Applicability

The disclosed gas turbine fuel injector with a rich catalyst may be applicable to any turbine engine where it is desirable to reduce $NO_x$ emissions by utilizing a catalytic combustion process, without increasing the size and decreasing the efficiency of the gas turbine engine. In the fuel injector of the current disclosure, a fuel-air mixture, rich in fuel, may be passed through a rich catalyst module included in the fuel injector before being directed to a combustor for combustion. A portion of the fuel in the fuel-rich mixture may be catalytically combusted in the catalyst module to increase the temperature of the fuel-air mixture exiting the catalyst module. This mixture may be further mixed with high temperature compressed air and directed to the combustor as a fuel-air mixture lean in fuel. Complete combustion of the remaining fuel in the high temperature lean fuel-air mixture may be carried out in the combustor. Since only a portion of the total fuel is combusted in the combustor, the total amount of $NO_x$ emitted by the turbine engine may be decreased.

By thoroughly mixing and creating turbulence in the lean fuel-air mixture entering the combustor, a compact flame may be established in combustor 30. Creating a compact flame may enable complete combustion of the fuel-air mixture in combustor without increasing the length of the combustor. Limiting the size of the combustor may decrease the cost and enable the gas turbine engine to be used in applications where space is at a premium.

Providing parallel streams of a lean fuel-air mixture and a rich fuel-air mixture through the fuel injector may enable $NO_x$ reduction while maintaining flame stability in combustor 50. By separating the flow of the lean fuel-air mixture and the rich fuel-air mixture, fuel flow to the combustor may be optimized to achieve both low $NO_x$ emissions and stable combustion at different operating conditions, thereby increasing efficiency.

It will be apparent to those skilled in the art that various modifications and variations can be made to the disclosed gas turbine fuel injector with a rich catalyst. Other embodiments will be apparent to those skilled in the art from consideration of the specification and practice of the disclosed gas turbine fuel injector with a rich catalyst. It is intended that the specification and examples be considered as exemplary only, with a true scope being indicated by the following claims and their equivalents.

We claim:

1. A fuel injector for a gas turbine engine comprising:
    a pilot assembly extending along a longitudinal axis, the pilot assembly having a central passage configured to receive fuel and an outer passage configured to receive air, the pilot assembly being configured to direct a pilot fuel-air mixture to a combustor of the gas turbine engine;
    a rich catalyst module disposed within a housing and circumferentially disposed about the pilot assembly, the catalyst module configured to simultaneously direct a stream of compressed air and a stream of first fuel-air mixture therethrough without intermixing;
    a shroud positioned over the housing and defining an inlet opening;
    a fuel line connected to the shroud to supply a fuel through a fuel injection orifice disposed within the shroud to the catalyst module;
    a post mix zone disposed downstream of the catalyst module, the post mix zone configured to mix the compressed air and the first fuel air mixture to create a main fuel-air mixture;
    an air swirler disposed downstream of the post mix zone, the air swirler being configured to direct the main fuel-air mixture to the combustor without intermixing with the pilot fuel-air mixture; and
    a secondary mixing zone disposed downstream of the swirler.

2. The fuel injector of claim 1, wherein an equivalence ratio of the first fuel-air mixture is above one and an equivalence ratio of the main fuel-air mixture is below one.

3. The fuel injector of claim 1, wherein the main fuel-air mixture enters the combustor circumferentially about the pilot fuel-air mixture.

4. The fuel injector of claim 1, wherein the catalyst module includes multiple hollow tubes extending along the longitudinal axis bundled together inside the housing.

5. The fuel injector of claim 4, wherein the stream of compressed air is directed through the multiple hollow tubes and the stream of first fuel-air mixture is directed through a space between the housing and an external surface of the multiple hollow tubes.

6. The fuel injector of claim 5, wherein the external surface is coated with a catalyst material.

7. The fuel injector of claim 1, wherein the post mix zone has a length between about 0.8 inches and about 2 inches.

8. The fuel injector of claim 1, wherein the secondary mixing zone has a length between about 0.5 inches and about 4 inches.

9. A fuel injector for a gas turbine engine, comprising:
    a center body having a central passageway to receive pilot fuel and an outer passage to receive air, the center body being configured to direct a stream of pilot fuel-air mixture to a combustor of the gas turbine engine,
    an annular outer passageway positioned circumferentially about the center body, the outer passageway configured to direct a stream of lean fuel-air mixture to the combustor without mixing with the pilot fuel-air mixture;
    a catalyst module positioned in the outer passageway, the catalyst module disposed within a housing and configured to simultaneously direct a stream of compressed air and a stream of rich fuel-air mixture therethrough without intermixing;
    a shroud positioned over the housing and defining an inlet opening;
    a fuel line connected to the shroud to supply fuel through a fuel injection orifice disposed within the shroud to the catalyst module;
    a post mix zone positioned downstream of the catalyst module to mix the compressed air and the rich fuel-air mixture to create the lean fuel-air mixture;
    an air swirler positioned downstream of the post mix zone; and
    a secondary mixing zone disposed downstream of the swirler.

10. The fuel injector of claim 9, wherein an equivalence ratio of the pilot fuel-air mixture is above one and an equivalence ratio of the lean fuel-air mixture is below one.

11. The fuel injector of claim 9, wherein the lean fuel-air mixture enters the combustor circumferentially about the pilot fuel-air mixture.

12. The fuel injector of claim 9, wherein the catalyst module includes multiple hollow tubes extending along the longitudinal axis bundled together inside the housing.

13. The fuel injector of claim 9, wherein the post mix zone has a length between about 0.8 inches and about 2 inches.

14. The fuel injector of claim 9, wherein the secondary mixing zone has a length between about 0.5 inches and about 4 inches.

* * * * *

UNITED STATES PATENT AND TRADEMARK OFFICE
CERTIFICATE OF CORRECTION

PATENT NO. : 8,381,531 B2
APPLICATION NO. : 12/289969
DATED : February 26, 2013
INVENTOR(S) : Nazeer et al.

It is certified that error appears in the above-identified patent and that said Letters Patent is hereby corrected as shown below:

In the Specification

Column 1, line 43, delete "about±3%" and insert -- about ±3% --.

Column 4, lines 36-55, delete "Rich fuel-air mixture 16b may include fuel mixed with compressed air such that the variation of the fuel to air ratio at different regions of the mixture may be within about ±10%. The temperature of rich fuel-air mixture 16b may be close to the temperature of the air discharged by compressor system 10. In some applications, this temperature may be about 800.degree. F. Although, the relative proportions of fuel and air in rich fuel-air mixture 16b may vary with application, in general, rich fuel-air mixture 16b may have an equivalence ratio greater than one. Rich fuel-air mixture 16b may include fuel mixed with compressed air such that the variation of the fuel to air ratio at different regions of the mixture may be within about ±10%. The temperature of rich fuel-air mixture 16b may be close to the temperature of the air discharged by compressor system 10. In some applications, this temperature may be about 800.degree. F. Although, the relative proportions of fuel and air in rich fuel-air mixture 16b may vary with application, in general, rich fuel-air mixture 16b may have an equivalence ratio greater than one."

and insert -- Rich fuel-air mixture 16b may include fuel mixed with compressed air such that the variation of the fuel to air ratio at different regions of the mixture may be within about ±10%. The temperature of rich fuel-air mixture 16b may be close to the temperature of the air discharged by compressor system 10. In some applications, this temperature may be about 800.degree. F. Although, the relative proportions of fuel and air in rich fuel-air mixture 16b may vary with application, in general, rich fuel-air mixture 16b may have an equivalence ratio greater than one. --.

Column 5, lines 1-2, delete "mixture 16b. may be combusted" and insert -- mixture 16b may be combusted --.

Column 5, lines 34-35, delete "a length L1. of post mix" and insert -- a length L1 of post mix --.

Column 6, line 31, delete "Industrial Applicability" and insert -- INDUSTRIAL APPLICABILITY --.

Signed and Sealed this
Eleventh Day of August, 2015

Michelle K. Lee
*Director of the United States Patent and Trademark Office*